Dec. 10, 1968
J. McCHESNEY
3,415,567
TRUCK BODY
Filed April 17, 1967
2 Sheets-Sheet 1
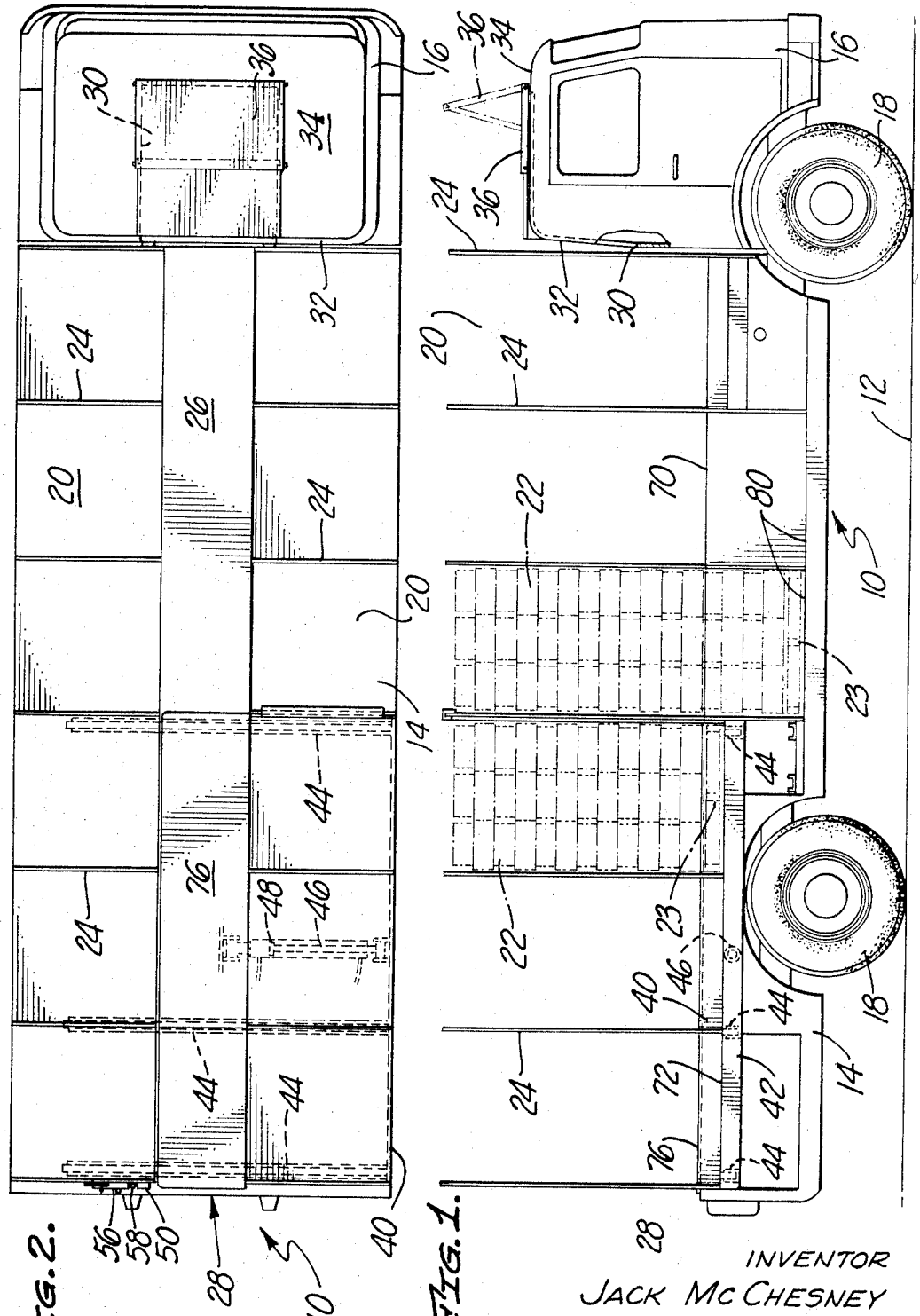
INVENTOR
JACK McCHESNEY
BY HIS ATTORNEYS
HARRIS, KIECH, RUSSELL & KERN

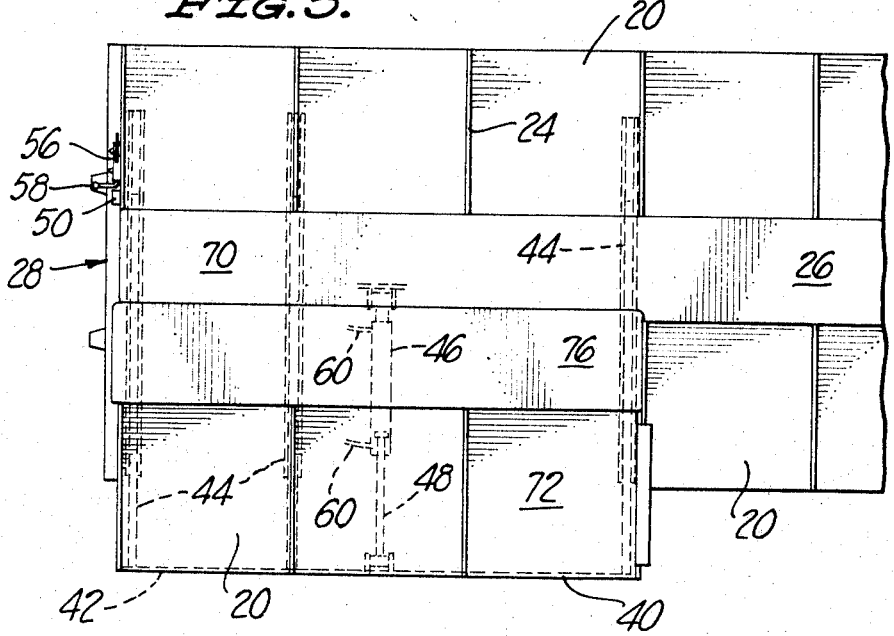

United States Patent Office 3,415,567
Patented Dec. 10, 1968

3,415,567
TRUCK BODY
Jack McChesney, Torrance, Calif., assignor to Coca-Cola Bottling Company of Los Angeles, Calif., a corporation of California
Filed Apr. 17, 1967, Ser. No. 631,392
5 Claims. (Cl. 296—3)

ABSTRACT OF THE DISCLOSURE

A side and rear loading and unloading truck body particularly suited for carrying cases of bottles and the like. A truck bed with open side storage bays and a central longitudinal pedestrian passageway therebetween interconnecting the cab and rear end. Lateral movement of some of the bays provides additional passage space at the rear of the truck bed.

---

In numerous industries such as the soft-drink industry, delivery trucks are used to transport the goods or articles of the producer or supplier to the immediate customer. Frequently one delivery truck load is sufficient to service a number of varied customers. The accessibility of the loaded goods and the ease and swiftness of the loading and unloading operations therefore become important features in the design of the truck body. Where rear loading and unloading operations of a truck have become impractical, delivery trucks have been constructed with open side bays with the goods being accessibly stored therein on the sides of the truck bodies.

Delivery trucks constructed with the open side bays have produced other accessibility problems, however. The heights of the supporting truck beds have been designed so that loading operations may be conducted from an elevated dock or platform. Oftentimes, however, not enough space at the dock or platform is available for the delivery truck to be parked parallel and along the platform and the truck must therefore be backed up to the dock and the goods loaded or unloaded from this position. The relative heights of the supporting truck beds now render it very difficult and impractical for a person to reach the goods stored on the sides of the truck during manual loading and unloading operations. Further, the goods must sometimes be carried the length of the truck to the dock or platform and then lifted up to the level of the platform. Also, there is no direct accessibility to the interior of the storage area from the rear of the truck adjacent the dock.

Accordingly, it is an object of this invention to provide a truck body wherein the transported goods are more freely and easily accessible during both side and rear loading and unloading operations.

Another object of the invention is to provide a truck body having vertical open side storage bays which extend both above and below the normal bed of said truck body.

Still another object of the invention is to provide a truck body having vertical open side storage bays and a passageway extending the length of the bed of the truck body and centrally located between the side bays. A further object of the invention is to provide an opening in the cab of the truck body interconnecting the cab with said passageway. Still another object of this invention is to provide a truck body with vertical open side storage bays wherein a rear portion of said bays may be moved laterally to enlarge said passageway and to provide a space for working at the rear of said truck body.

Yet another object of this invention is to provide in a driver-operated truck body for transporting and delivering articles, the combination of a truck bed for supporting the articles, a cab, and vertically disposed divider means carried on the bed and defining a plurality of storage bays longitudinally positioned along each side of the bed, with the bays spaced laterally defining a longitudinal passageway therebetween extending from the cab to the rear of the bed, and with the cab including means defining a walk-through opening allowing the driver direct access from the cab to the passageway.

Further objects and advantages will become apparent from the following description when taken in connection with the accompanying drawings.

In the drawings:

FIG. 1 is a side elevational view of a truck body as embodying the invention;

FIG. 2 is a top plan view of the truck body of FIG. 1;

FIG. 3 is a rear end view of the truck body of FIGS. 1 and 2 with rear storage bays in the normal driving or transport position;

FIG. 4 is a rear end view of the truck body showing the rear bays in the side extended positions; and FIG. 5 is a partial top plan view of the truck body with the rear bays extended as in FIG. 4.

In the drawings, a truck body 10 is shown riding on a roadway 12. The truck body 10 generally comprises a truck storage bed 14 and an independent cab 16 which are structurally supported by the customary frame support (not shown in detail) which is disposed above the roadway 12 by axles 11 and wheels 18.

As shown by FIGS. 1 and 2, the storage bed 14 is divided into a plurality of open side bays 20 on both sides. Six bays 20 per side or a total of twelve bays are shown as exemplary of a typical delivery truck body used in hauling stacked cases 22 of bottled soft drinks (generally shown by dashed lines in FIG. 1). The bays 20 are separated vertically by rigid dividers 24 which provide vertical support for the articles stored in the respective bays 20. Centrally located between the side rows of bays and running the length of the truck bed 14 is a pedestrian passageway or walkway 26 formed as part of the bed 14. This passageway 26 allows the deliveryman or other person access to the transported articles from the interior of the bed 14 of the truck body 10. The transported articles 22 may therefore be loaded or unloaded from the rear 28 of the truck body 10 by means of the passageway 26. For example, cases of bottled soft drinks 22 may be loaded onto pallets 23 at the warehouse. A forklift (not shown) or other similar machine may then be used to load the pallets 23 of stacked cases 22 onto the truck bed 14. The bays 20 are sized to receive one stacked pallet load of the cases. Unloading may be accomplished in the same fashion, or from the interior of the storage bed 14 by means of the passageway 26. The passageway 26 is sized to accommodate a typical hand truck or dolly (not shown) and the deliveryman can load or unload a case or a stack of cases from the interior of the storage bays 20 using the hand truck as a means of transporting a number of the cases through the passageway 26 and to or from the rear 28 of the truck body 10.

The cab 16 for the driver or deliveryman is provided with an opening 30. The opening 30 extends from approximately midheight of the back 32 of the cab 16, or from approximately bottom-window height of the cab 16, upwardly and partially into the roof 34 of the cab 16, as shown in FIGS. 1 and 2. The opening 30 is located generally centrally of the cab 16 and approximates or slightly exceeds the width of the passageway 26 of the truck bed 14. The driver of the cab or the deliveryman therefore has direct access from behind his seat (not shown) to the passageway 26 by merely walking over his seat. The driver may reach the interior of the truck bed 14 directly from the cab 16 without dismounting from the cab 16 and walking to the rear 28 of the truck body 10. A slidable hatch-type door 36 is shown as a cover for the portion of the opening 30 which extends into the roof 34 of the cab 16. In FIG. 1 the hatch-type door 36 is shown in its open position by dashed lines.

It can therefore be seen that the pedestrian passageway 26 interconnected to the cab 16 by the opening 30 provides the objectives of the invention of direct accessibility of the stored articles from the cab 16 and increased accessibility from the interior of the truck bed 14. The deliveryman may enter the interior of the truck bed 14 directly from the cab 16 and the stored articles may be loaded or unloaded from the interior of the truck bed 14 through the passageway 26 to the rear 28 of the truck body 10. The articles may also be loaded or unloaded from outside the truck body 10 on either side.

To provide additional working space at the rear 28 of the truck body, a portion 40 of the bays 20 is slidably mounted so as to move laterally outwardly as shown in FIGS. 2 through 5. The rear three bays on one side of the truck body are shown as movable together, as illustrative of a typical movable portion 40 of the bays 20. As shown in FIG. 5, a base 42 of the movable portion 40 is slidably mounted on three tracks or channels 44. Preferably, lateral movement of the portion 40 is hydraulically actuated as by a hydraulic cylinder 46 and piston 48 which are connected to a pump (not shown). The pump in turn is driven by a motor (not shown) which is electrically controlled by a switch 50. The switch 50 typically consists of an off-on toggle switch 52 and a start button 54. The hydraulic system for the movable portion 40 is directionally controlled by a control panel 56 having a control valve 58 and lines 60 interconnected with the hydraulic cylinder 46 and lines 62 interconnected with the pump. The operator can therefore actuate the pump by means of the electrical control switch 50 and can, by means of the control valve 58, hydraulically move the portion 40 into the laterally extended position as shown in FIGS. 4 and 5, and return it to the normal driving or transporting position as shown by FIGS. 1 through 3. It should be noted that the particular movement means described here is for exemplary purposes only and should not in any way limit the scope of the invention.

In the typical embodiment of the truck body as shown in the drawings, the passageway 26 has a floor 70 slightly higher than the normal beds or bases 72 of the bays 20. This is to allow the upper surface of the pallets or other supports 23 for the transported articles 22 (indicated by dashed lines in FIG. 1) to approximate the same elevation as the floor 70 of the passageway 26. A thin, sturdy, preferably metallic member 76 is attached to the portion 40 and rests upon the floor 70 of the passageway 26 while in the normal transport position as shown in FIG. 3. As the portion 40 is moved or extended laterally, the member 76 slides laterally adjacent the floor 70 and continues thereby to provide standing or working area approximating the elevation of the floor 70 of the passageway 26. As can be seen, the lateral extension of the portion 40 provides additional working space at the rear of the truck bed 14 for the loading and unloading of the transported articles. This increased working space also increases the accessibility of the interior storage areas of the truck bed 14, which is an object of the invention.

Another advantage of this invention is as shown in FIG. 1. It has been found very difficult at times for a man to load and unload articles from the side of a typical truck body because of the normal height of the bases or beds 72 of the bays 20 from the roadway 12. In a preferred embodiment of the invention, certain of the bays 20 intermediate the portion 40 and the cab 16 are provided with beds or bases 80 which are constructed below the normal beds or bases 72. As shown in FIG. 1, the normal bases or beds 72 ride above the wheels 18 while the bases or beds 80 of the intermediate bays ride at approximately the midheight of the wheels 18. Because of the reduced height of the beds 80 of the intermediate bays, goods may be stored on these bays for easy access to a person standing on the roadway 12 during loading or unloading operations of individual cases 22 of the soft drinks.

Various changes, modifications, and substitutions may be made by those having ordinary skill in the art without departing from the spirit and scope of this invention.

I claim:

1. In a driver-operated truck body for transporting and delivering articles, the combination of:
   a truck bed for supporting the articles;
   a cab including a roof and a back; and
   vertically disposed divider means carried on said bed and defining a plurality of storage bays longitudinally positioned along each side of said bed, with said bays spaced laterally defining a longitudinal passageway therebetween extending from said cab to the rear of said bed;
   said cab including means defining a walk-through opening extending into a portion of said roof and a portion of said back allowing the driver direct access from said cab to said passageway, said opening approximating the width of said passageway.

2. A truck body as defined in claim 1 including means for moving at least a rear portion of said storage bays along at least one side laterally to enlarge a part of said passageway and to provide additional working area at the rear of the truck body.

3. A truck body as defined in claim 1 wherein said truck bed forms base portions of said bays and wherein the base portions of an intermediate number of said bays between said rear portion and said cab are positioned below the remainder of said base portions.

4. A truck body as defined in claim 1 including a door for closing the opening extending into the portion of said roof.

5. In a truck body adapted for use in the transport and delivery of stacked cases of bottles, the combination of:
   a cab including a roof and a back;
   a truck bed for storing said cases including vertically disposed divider means carried by said bed and defining a plurality of storage bays longitudinally partitioned along each side of said bed and sized to receive a pallet supporting a number of said cases, said bays spaced laterally defining a longitudinal passageway therebetween extending from said cab to the rear of said bed providing for loading and unloading from said passageway and from either side of said truck bed;
   means for laterally extending at least a rear portion of said bays to enlarge a part of said passageway at the rear of said truck bed; and
   means defining a walk-through opening in said cab extending into a portion of said roof and a portion of said back allowing pedestrian access to said passageway directly from said cab, said opening approximating the width of said passageway.

References Cited

UNITED STATES PATENTS

| | | | |
|---|---|---|---|
| 1,432,439 | 10/1922 | Bixler | 296—24 |
| 2,896,996 | 7/1959 | Atwater | 296—3 |
| 1,900,778 | 3/1933 | Tatum | 296—3 |
| 2,973,221 | 2/1961 | Blackman | 49—36 X |

PHILIP GOODMAN, *Primary Examiner.*

U.S. Cl. X.R.

296—26; 49—36